United States Patent [19]
Purkey et al.

[11] Patent Number: 5,418,776
[45] Date of Patent: May 23, 1995

[54] EMERGENCY LOCAL SWITCHING

[75] Inventors: Robert C. Purkey, Mendham; Steven P. Spencer, Livingston; James K. Wheeler, Township of Mine Mill, Morris County, all of N.J.

[73] Assignee: AT&T Corp., Murray Hill, N.J.

[21] Appl. No.: 23,648

[22] Filed: Feb. 26, 1993

[51] Int. Cl.⁶ .......................... H04J 3/12; H04M 3/24
[52] U.S. Cl. ..................... 370/16; 370/68.1; 370/110.1; 371/9.1; 371/11.3; 379/284
[58] Field of Search .................. 370/13, 14, 15, 16, 370/54, 56, 58.1–58.3, 68, 68.1, 110.1, 112; 379/220, 221, 273, 274, 269, 279, 284; 340/825.03, 825.06, 826, 827; 371/8.1, 8.2, 11.1, 9.1, 11.2, 11.3

[56] References Cited
U.S. PATENT DOCUMENTS

| | | | |
|---|---|---|---|
| 4,394,756 | 7/1983 | Canniff | 370/110.1 |
| 4,558,444 | 12/1985 | Kennedy et al. | 370/110.1 |
| 4,566,094 | 1/1986 | Ardon et al. | 370/58.3 |
| 4,583,218 | 4/1986 | Ardon et al. | 370/58.3 |
| 4,943,999 | 7/1990 | Ardon | 370/54 |
| 4,979,164 | 12/1990 | Ardon | 370/16 |
| 5,046,067 | 9/1991 | Kimbrough | 370/68.1 |
| 5,115,425 | 5/1992 | Ardon | 370/16 |

Primary Examiner—Alpus Hsu
Attorney, Agent, or Firm—Lester H. Birnbaum

[57] ABSTRACT

Disclosed is an apparatus and method for providing transmission between end users coupled to a digital loop carder access system. During normal operation, the access system functions to transmit data and supervisory signals between each end user and a local digital switch. In the event of a failure in the coupling between the access system and switch, the access system provides transmission paths between each end user and designated users such as emergency services which am coupled to the same access system.

14 Claims, 4 Drawing Sheets

ACCESS SYSTEM 11

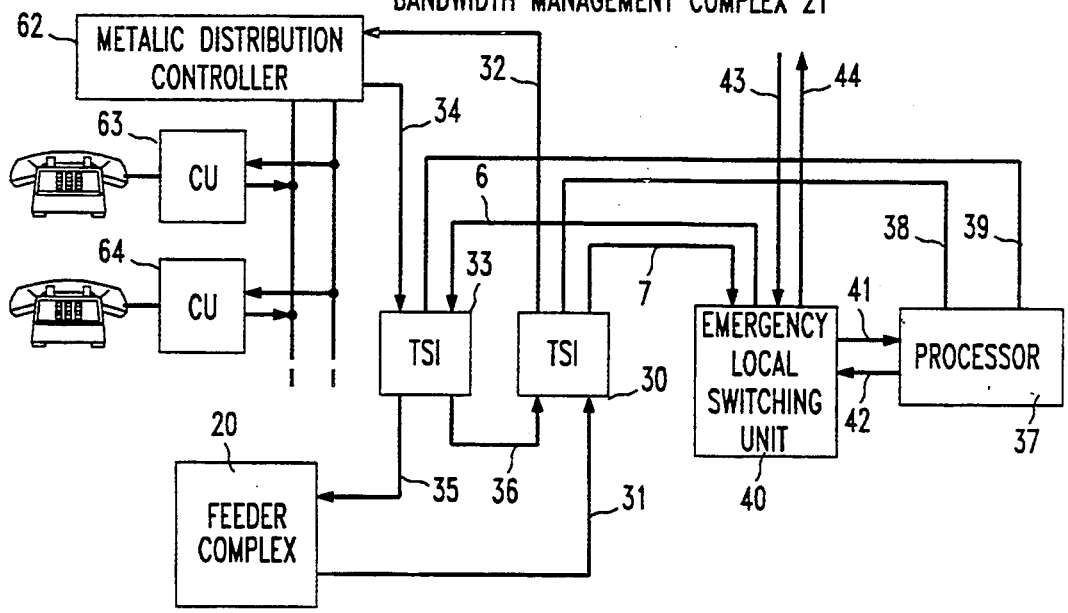
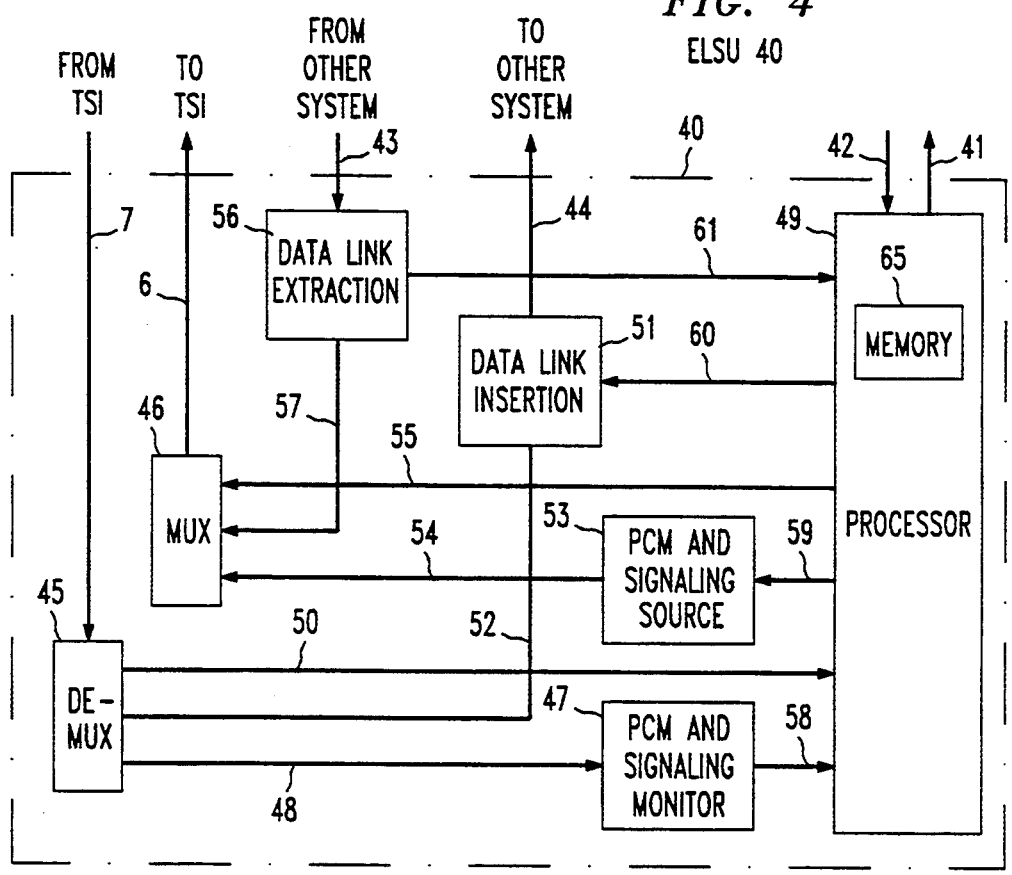

EMERGENCY LOCAL SWITCHING

BACKGROUND OF THE INVENTION

This invention relates to digital loop carrier transmission systems.

In digital loop carrier transmission systems, bidirectional transmission takes place between end users and a local digital switch at a central office through some access system such as a remote terminal. It is generally desirable for local digital switches to be capable of routing calls among end users even when links with other local digital switches are inoperative. In the modernization of rural telephone equipment, this feature can be assured by replacing old switches with new switches. However, this is a fairly expensive proposition.

A less expensive alternative would be to provide emergency access among end users served by an access system which can include one or more remote terminals.

SUMMARY OF THE INVENTION

In one aspect, the invention is an apparatus for transmitting and receiving data and supervisory signals in a digital loop carrier transmission system comprising an access system adapted for coupling to a local digital switch and to a plurality of end users. The access system comprises means for providing a transmission path between each end user and the switch to be coupled to the access system. The system further includes means for providing a transmission path from each end user to designated ones of other end users to be coupled to the access system in the event of a failure in the coupling of the access system to the switch.

In accordance with another aspect, the invention is a circuit for providing telecommunications between end users coupled to an access system in a digital loop carrier transmission system in the event of a failure in the coupling of the access system to a local digital switch. The circuit comprises means for receiving data and supervisory signals from an end user when the circuit is coupled to the access system. Means are also provided for monitoring the data and supervisory signals. Means are further provided for generating data and supervisory signals in response to data and supervisory signals received from the end user, and for transmitting the generated data and supervisory signals to another end user coupled to the access system. Means are also provided for controlling the coupling of the two end users together.

In accordance with a further aspect, the invention is a method of transmitting and receiving data and supervisory signals in a digital loop carrier transmission system among end users coupled through an access system and feeder lines to a local digital switch. The method comprises the steps of determining if there is a failure in the feeder lines between the switch and access system, and, in the event of failure, routing data and supervisory signals from an end user to one of a plurality of other users also coupled to the access system.

BRIEF DESCRIPTION OF THE DRAWINGS

These and other features of the invention are delineated in detail in the following description. In the drawing:

FIG. 3 is a block diagram of a portion of the access system of FIG. 2 in accordance with an embodiment of the invention;

FIG. 4 is a block diagram of a portion of the system of FIG. 3 in accordance with the same embodiment;

DETAILED DESCRIPTION

Figure 1:
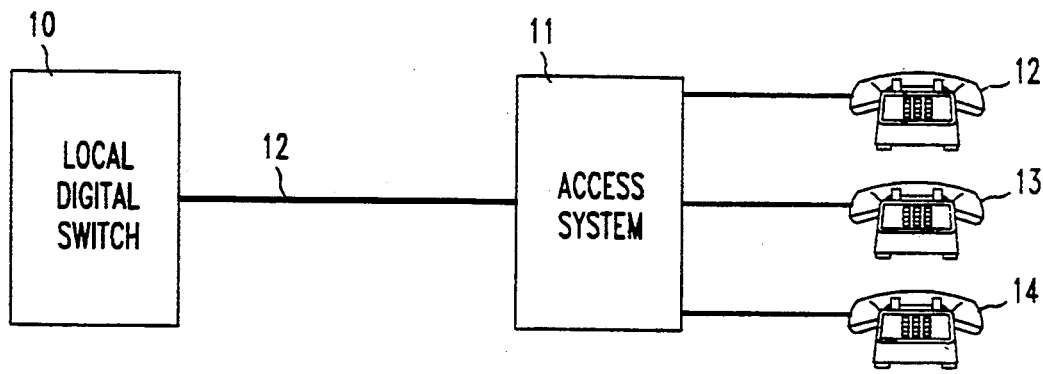
FIG. 1 is a block diagram of a typical digital loop carrier transmission system incorporating the invention.

In a typical digital loop carrier transmission system, as shown in FIG. 1, bidirectional transmission takes place between a local digital switch 10, usually located at a central office, and an access system 11, usually in the form of a remote terminal. The link 12 between the two, also known as feeder lines, can be optical or electrical. A plurality of end users, e.g., 12, 13 and 14, are coupled to the local digital switch through the access system 11. Again, the link between the end users and the access system, also known as the distribution lines, can be optical or electrical.

Figure 2:
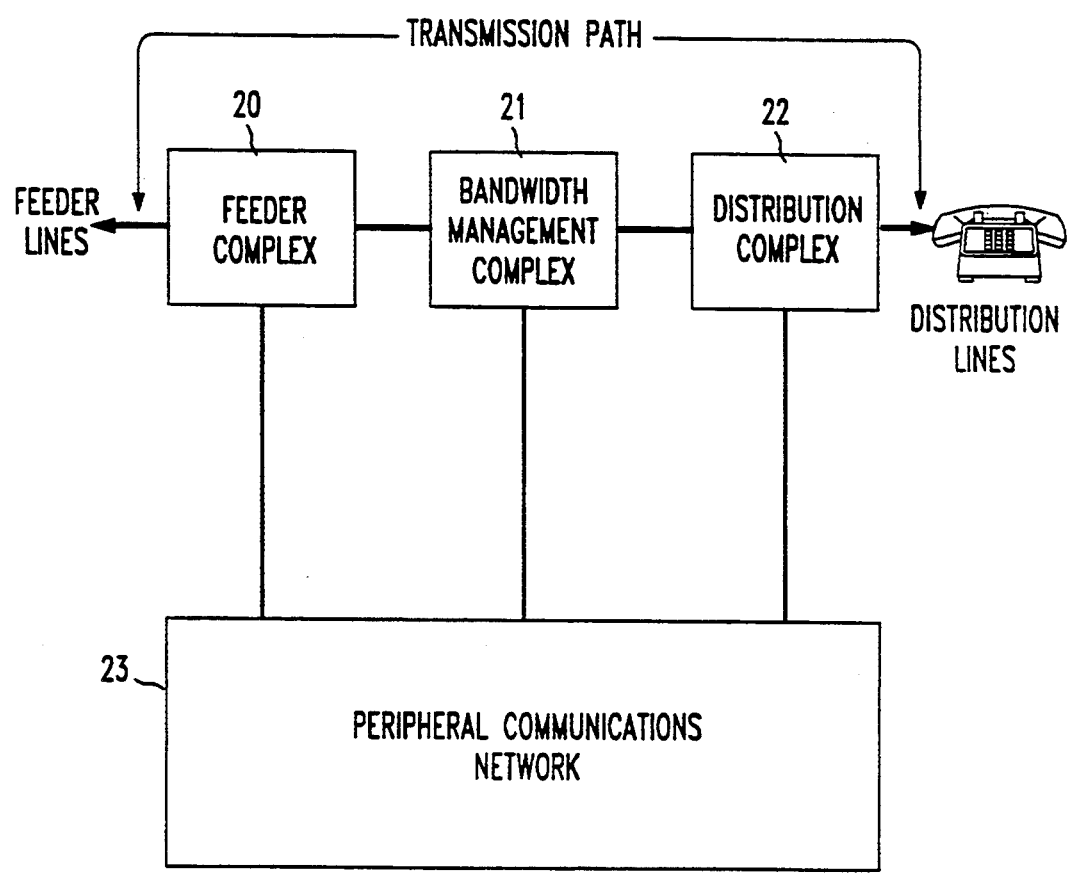
FIG. 2 is a block diagram of a typical access system of the transmission system of FIG. 1 incorporating the invention.

FIG. 2 illustrates the access system 11 in some more detail. The interface to the feeder lines is provided by the feeder complex 20, which converts the signal format between what is compatible with link 12 and what is compatible with the access system. For example, the feeder complex can receive four 24-time slot signals from the switch, convert to two 64-time slot signals, and reverse the operation in the other direction. In the event that the feeder lines carry an optical signal, the feeder complex can also convert to electrical signals.

The feeder complex 20 is coupled to the bandwidth management complex 21, which includes a plurality of time slot interchangers (tsi) to be discussed in more detail. The primary function of the bandwidth management complex, therefore, is to distribute the time slot signals so that information arrives at its proper destination. Ordinarily, this function is controlled by signals from the local digital switch.

The distribution complex 22 generally includes the functions of transmit receive units, bank controller units, and channel units. That is, it provides the major portion of the multiplexing/demultiplexing function, the control of the components of the access system, and the interface between the access system and the end users.

The various portions of the access system can communicate with one another over the peripheral communications network 23. An example of such a network is described in U.S. patent application of Andrews et al., Ser. No. 07/953,571 filed Oct. 6, 1992 and assigned to the present assignee.

FIG. 3 illustrates in more detail portions of the bandwidth management complex 21 which include features of the invention. The feeder complex 20 is coupled to a first time slot interchanger (tsi), 30, over transmission path 31. The tsi 30 is coupled to a metallic distribution controller (MDC), 62, which is part of the distribution complex (22 of FIG. 2) by means of transmission path 32. In the reverse direction, the MDC 62 is coupled to a second tsi 33 over transmission path 34, and the tsi 33 is coupled to the feeder complex 20 over transmission path 35. The two tsi's, 30 and 33, are also coupled together by transmission path 36. The MDC is coupled to a series of channel units (CU), e.g., 63 and 64, which provide the interfaces to the end users (e.g., 12 and 13 of FIG. 1).

The tsi's 30 and 33 are controlled by a microprocessor 37 which is coupled to the tsi's 30 and 33 by transmission paths 38 and 39, respectively.

A circuit indicated by box 40 is also coupled to tsi's 33 and 30 by means of transmission paths 6 and 7, respectively. This circuit, hereinafter referred to as the emergency local switching unit (ELSU), will be described in more detail below with reference to FIG. 4. The ELSU 40 is also coupled to the processor 37 by means of transmission paths 41 and 42. The latter paths, as well as ELSU 40 and processor 37, are typically part of the Peripheral Communications Network (23 of FIG. 2). Again, the paths 6, 7 and 41, 42 can typically carry 8 megabit/sec data signals.

The bandwidth management complex typically includes an additional bank of tsi's equivalent to 30 and 33, an ELSU equivalent to 40 and a processor equivalent to 37. These elements, not shown in FIG. 3, can be used for backup in the event of a failure of any particular element in the bandwidth management complex. The ELSU 40 can also be coupled to an ELSU (not shown) which is a part of a different access system by means of transmission paths 43 and 44 so that end users on different systems can communicate in a manner to be described.

FIG. 4 illustrates in more detail the ELSU 40. The circuit includes a demultiplexer 45 which is coupled to receive signals from a tsi (30 of FIG. 3) on transmission path 7, and a multiplexer 46 which is coupled to transmit signals to a tsi (33 of FIG. 3) over transmission path 6. The demultiplexer 45 has its outputs coupled to a pulse code modulation (PCM) data and supervisory signaling monitor 47 on path 48, as well as to a microprocessor 49 via path 50 and to a data link insertion circuit 51 over path 52. Multiplexer 46 has its inputs coupled to a source of PCM and supervisory signals 53 over path 54, the microprocessor 49 over path 55, and a data link extraction circuit 56 via path 57. The microprocessor 49 is also coupled to PCM and signaling monitor 47 via path 58, and to PCM and signaling source 53 via path 59. The microprocessor 49 is further coupled to the data link insertion circuit 51 over path 60 and to the data link extraction circuit 56 over path 61.

It will be understood in the context of this application that "data" refers to the digital information transmitted between end users (e.g., digitized voice) while "supervisory signals" refer to information about the state of the system (e.g., off-hook, on-hook, etc.). Furthermore, it will be understood that a plurality of time slots can be carried simultaneously over the same path (e.g., paths 32 and 34 can carry time slots for a plurality of end users).

In normal operation, the access system of FIGS. 1-3 will function in the usual mode, where the microprocessor 37 controls the mapping of the tsi's 30 and 33 based on signals received from the local digital switch 10. The normal path for PCM data and supervisory signals is from feeder complex 20 over path 31 to tsi 30 and then over path 32 to the MDC 62 to the appropriate CU to the end user. In the reverse direction, the normal path for data and signals is from a CU to the MDC, then over path 34 to tsi 33 and over path 35 to the feeder complex 20 to the switch.

In the event of a failure in the feeder links to or from the switch, the system enters an emergency mode whereby the ELSU 40 will command the microprocessor 37 over paths 41 and 42, to make the appropriate connections in the tsi's 30 and 33 so that end users can communicate with emergency facilities and other designated end users served by the same system or by a system coupled thereto over paths 43 and 44. In the emergency mode, the path for PCM and signaling will be from one CU (e.g., 63) to the MDC 62 then to tsi 33 over path 34, then to the other tsi 30 over loop-back path 36, and back to the MDC 62 over path 32 to another CU (e.g., 64). This path provides connection between end users coupled to the same system. For coupling end users connected to different systems, the path would again be from the MDC 62 to tsi 33 over path 34 and to tsi 30 over path 36. The signals and data would then be coupled to ELSU 40 over path 7 and then to another ELSU (not shown) in the other system over path 44. In the reverse direction, data and supervisory signals will be received from the other ELSU (not shown) of the other system over path 43 and will be coupled from ELSU 40 over path 6 to tsi 33. The data and supervisory signals would then be coupled to tsi 30 over path 36 and back to the MDC over path 32 and to the appropriate CU.

Figure 5:
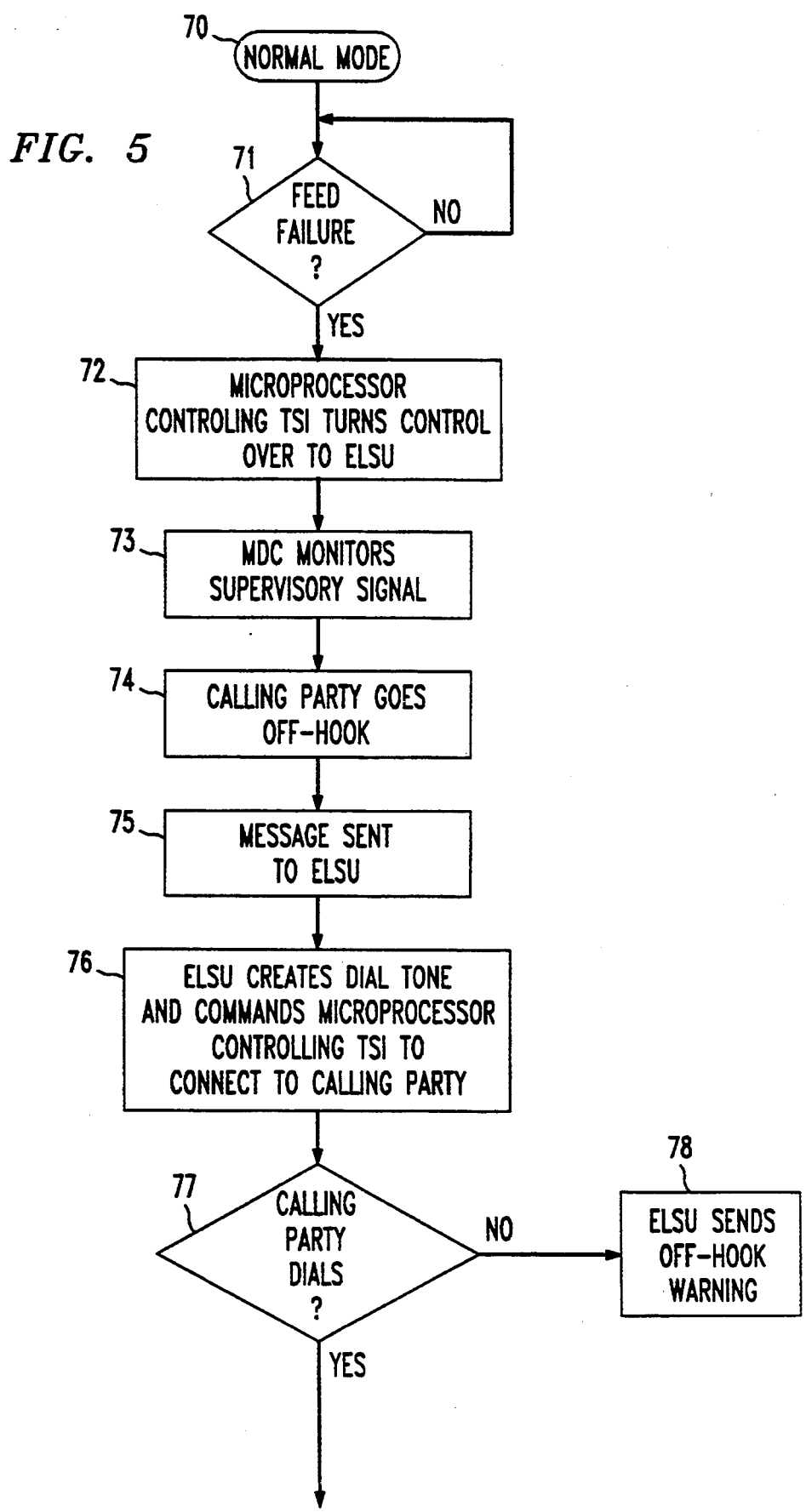
FIGS. 5 and 6 are flow diagrams illustrating the operation of the invention in accordance with the same embodiment.
Figure 6:
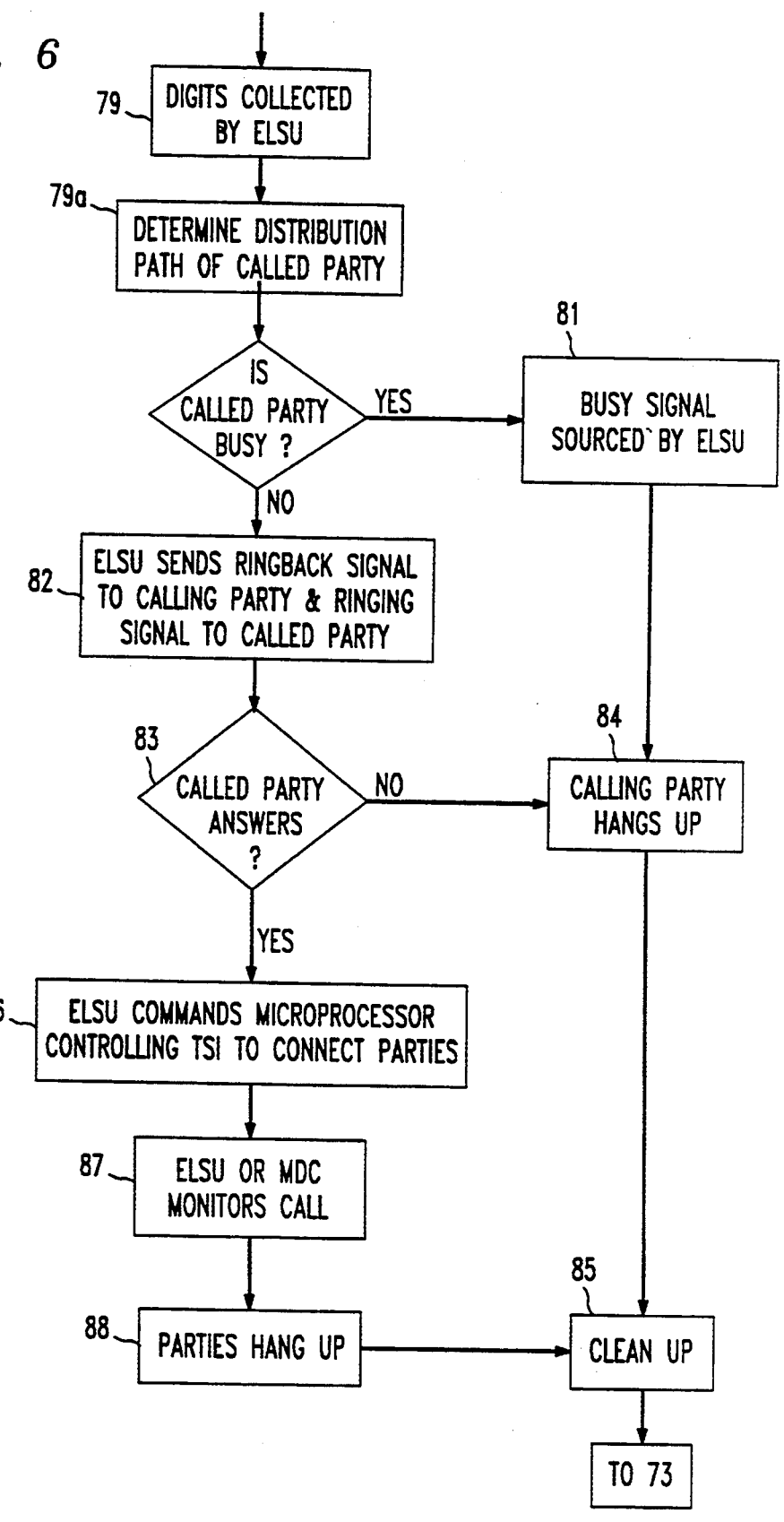
Figure 7:
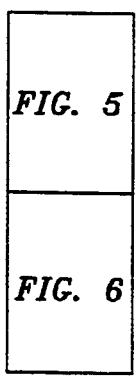
FIG. 7 is a diagram showing the relationship between FIGS. 5 and 6.

The basic operation of the invention will now be discussed in more detail with further reference to the flow diagrams of FIGS. 5 and 6. As discussed previously, the access system is in a normal mode (70) until a failure in the feeder lines is detected (71) by processor 37. At that time, as illustrated in step 72, the processor 37 then turns transmission path control over to microprocessor 49 in the ELSU. Further, in step 73, the metallic distribution controller (MDC), 62, typically, will monitor supervisory signaling to determine when an end user goes off-hook.

In the event that an end user (calling party) goes off-hook, step 74, that state will be detected, by the MDC. A message indicating the calling party is off-hook is sent from the MDC over the Peripheral Communication Network (PCN), 23 of FIG. 2, to the ELSU, as illustrated in step 75. Since the hub of the PCN is typically on the same circuit pack as the tsi's, 30 and 33 of FIG. 3, this message is conveniently sent over path 7 to demultiplexer, 45 of FIG. 4, and to the microprocessor 49 over path 50. The microprocessor 49 then commands over path 59 the PCM and signaling source 53 to send out a dial tone as illustrated in step 76. The dial tone is sent on path 54 through multiplexer 46 to tsi 33 over path 6. At the same time, a message is sent by microprocessor 49 over path 41 to the microprocessor, 37 of FIG. 3, controlling the tsi. This message commands the microprocessor 37 to connect the end user to the dial tone signal through tsi 30 and 33. That is, the path of the dial tone signal would be from ELSU, 40 in FIG. 3, over path 6 to tsi 33 and then over loop-back path 36 through tsi 30 to the end user via path 32 and MDC 62.

The ELSU will then monitor the line to determine if the end user is dialing, as illustrated by decision step 77. This is accomplished over the path including transmission path 34, tsi 33, loop-back path 36, tsi 30, transmission path 7, demultiplexer 45, transmission path 48 to the PCM and signaling monitor 47, and transmission path 58. If there is no dialing after a particular period of time, the microprocessor 49 will command the PCM and signaling source 53 to send an off-hook warning to the end user as illustrated in step 78. If the end user dials, the digits are collected by the ELSU microprocessor 49 as illustrated by step 79.

After the digits are collected, as illustrated by step 79a, the processor 49 determines which end user (e.g., 12 of FIG. 1) is the called party from data stored in memory 65 that maps telephone numbers to distribution paths. This memory can include any number of designated end users, but is typically limited to a few emergency numbers. If the line is busy, as shown by steps 80 and 81, the ELSU will produce a busy signal from PCM and signaling source 53 to the calling party. Again, the path is through multiplexer 46, transmission path 6, tsi 33, loop-back path 36, tsi 30, transmission path 32, and MDC 62. If the line is not busy, a ringing signal is sent to the called party and a ring back signal is sent to the calling party as illustrated in step 82. The ring back signal follows the same path as the busy signal. The ringing signal is sent from source 53 through the multiplexer 46 over path 6 and through the tsi's 33 and 30.

The PCM and signaling monitor 47 of the ELSU will then determine if and when the called party picks up as illustrated by the decision step 83. If there is no pickup, the calling party hangs up (step 84), and a clean-up procedure is carried out (step 85) where any connections through the tsi's between the calling and called parties are released by the microprocessor 37 under the command of the ELSU microprocessor 49. If the called party answers, the ELSU will command the microprocessor 37 (over path 41) to connect the calling and called parties through the tsi's 33 and 30 over transmission paths 34, 36 and 32, as illustrated by step 86.

While the call is in progress, as shown by step 87, the ELSU will monitor the call via PCM and signaling monitor 47 to determine when the parties hang up. Alternatively, the metallic distribution controller (MDC) could monitor the call and notify the ELSU when the parties hang up. At the end of the call, the parties hang up (step 88), and the ELSU notifies the microprocessor 37 to disconnect the parties (clean-up step 85).

In the event that the calling and called parties are connected to different access systems, the link 43, 44 between the ELSUs of the two systems can be utilized. Specifically, PCM data and supervisory signals coming into ELSU 40 on path 7 are received by demultiplexer 45 of FIG. 4. The data and supervisory signals intended for the party coupled to the other system are coupled from the output of the demultiplexer on transmission path 52 to data link insertion circuit 51, and transmitted to the other system over transmission path 44. Data and supervisory signals are received from the other system on path 43, extracted by the data link extraction circuit 56, and coupled to the input of multiplexer 46 via path 57 for transmission to the party over path 6. Any commands from microprocessor 49 to the other system are transmitted by path 60 to the data link insertion circuit 51, while any commands from the other system are coupled from data link extraction circuit 56 to the microprocessor 49 on path 61.

It will also be appreciated that while the system is operating in the emergency mode, the processor 37 will continuously monitor the feeder lines to see if normal transmission has been restored. Once the system recovers, the processor 37 will return the system to the normal mode.

Various modifications of the invention will become apparent to those skilled in the art. All such variations which basically rely on the teachings through which the invention has advanced the art are properly considered within the scope of the invention.

We claim:

1. Apparatus for transmitting and receiving data and supervisory signals in a digital loop carrier transmission system comprising a remote terminal adapted for coupling data and supervisory signals between a local digital switch and a plurality of end users, said remote terminal comprising:

first means for providing a first transmission path for data and supervisory signals between each end user and the switch to be coupled to the remote terminal during a normal mode of operation comprising a pair of time slot interchangers controlled by a first microprocessor in response to signals from the switch, wherein during the normal mode of operation one of the time slot interchangers is adapted to receive data and supervisory signals from an end user and transmit same to the switch, while the other time slot interchanger is adapted to receive data and supervisory signals from the switch and transmit same to an end user; and second means for providing a second transmission path for data and supervisory signals from each end user to designated ones of other end users to be coupled to the remote terminal in the event of a failure in the coupling of the remote terminal to the switch, said means comprising said pair of time slot interchangers coupled together by a portion of the second transmission path and further comprising a second microprocessor adapted for call processing coupled to the first microprocessor, the second microprocessor being adapted for controlling the first microprocessor only in the event of a failure in the coupling of the remote terminal to the switch.

2. Apparatus according to claim 1 further comprising a source for generating data and supervisory signals in the event of a failure and a monitor for monitoring data and supervisory signals in the event of a failure, said source and monitor being coupled to said second microprocessor and to the time slot interchangers.

3. Apparatus according to claim 2 wherein said source is coupled to said one of the time slot interchangers through a multiplexer and said monitor is coupled to said other time slot interchanger through a demultiplexer.

4. Apparatus according to claim 1 wherein the first and second microprocessors are coupled together over a peripheral communication network.

5. Apparatus according to claim 1 further comprising means for coupling the second microprocessor to another remote terminal.

6. A circuit for providing telecommunications between end users coupled to a remote terminal in a digital loop carrier transmission system only in the event of a failure in the coupling of the remote terminal to a local digital switch, said circuit comprising means for receiving a first set of data and supervisory signals from an end user when the circuit is coupled to the remote terminal;

means for monitoring said first set of data and supervisory signals;

means for generating a second set of data and supervisory signals in response to the first set of data and supervisory signals received from the end user;

means for transmitting said generated second set of data and supervisory signals to another end user coupled to the remote terminal; and means comprising a first microprocessor for controlling the coupling of the two end users together, said first microprocessor being adapted for coupling to a second microprocessor which controls coupling of either end user to the switch in response to signals from the switch, said first microprocessor being further adapted for controlling the coupling of the two end user is by means of the second microprocessor only in the event of a failure in coupling the remote terminal to the switch.

7. The circuit according to claim 6 wherein the means for receiving the first set of data and supervisory signals comprises a demultiplexer.

8. The circuit according to claim 6 wherein the means for transmitting the second set of data and supervisory signals comprises a multiplexer.

9. The circuit according to claim 6 further comprising means for coupling said circuit to another remote terminal for transmitting the first set of data and supervisory signals.

10. The circuit according to claim 6 further comprising means for coupling the microprocessor to another microprocessor when the circuit is coupled to the remote terminal.

11. A method of transmitting and receiving data and supervisory signals in a digital loop carrier transmission system among end users normally coupled through a remote terminal and feeder lines to a local digital switch comprising the steps of:

controlling coupling of end users to the switch by means of a first microprocessor in response to signals from the switch;

determining if there is a failure in the feeder lines between the switch and remote terminal; and in the event of said failure, routing data and supervisory signals from an end user to one of a plurality of other users also coupled to said remote terminal by means of a second microprocessor which controls the coupling of the end users together by means of the first microprocessor only in the event of a failure in coupling the remote terminal to the switch.

12. The method according to claim 11 wherein the data and supervisory signals are routed by coupling the end users to each other through a pair of time slot interchangers coupled together with a loop-back path.

13. The method according to claim 12 wherein the end users are coupled by sending messages from the second microprocessor which monitors the data and supervisory signals to the first microprocessor which controls the time slot interchangers.

14. The method according to claim 13 wherein the second microprocessor also controls the creation of certain data and supervisory signals to one end user in response to data and supervisory signals from another end user.

* * * * *